Patented Jan. 24, 1950

2,495,629

UNITED STATES PATENT OFFICE 2,495,629

ZINC ELECTROPLATING

Allan E. Chester, Highland Park, and Frederick F. Reisinger, Waukegan, Ill., assignors to Poor & Company, Chicago, Ill., a corporation of Delaware No Drawing. Application June 2, 1944, Serial No. 538,557

20 Claims. (Cl. 204—55)

This invention relates to new and useful electroplating compositionst, and to a new and improved method for the electrodeposition of zinc.

One of the objects of the invention is to prepare new and useful cyanide-zinc plating baths.

Another object of the invention is to prepare new and useful cyanide-zinc plating baths containing complex organic compounds which are soluble in alkaline solutions and which produce improved color and brightening effects.

An additional object of the invention is to provide a new and improved method for electrodepositing bright zinc plates. Other objects will appear hereinafter.

In accordance with the invention, new and useful cyanide-zinc plating baths are provided containing reaction products obtained by the reaction of cyclic aldehydes, preferably heterocyclic aldehydes with cyclic amino compounds, preferably cyclic amino carboxylic acids.

A cyclic aldehyde useful as one of the starting materials for the preparation of the aforesaid reaction products may be illustrated by the general formula

in which R represents an organic radical, residue or nucleus, having a cyclic or ring structure, preferably a heterocyclic structure, as for example an oxyheterocyclic structure, or a thioheterocyclic structure, or an N-heterocyclic structure, and preferably containing one or two ring nuclei (see Hackh, Chemical Dictionary (1929), page 355).

A cyclic amino compound useful as the other starting material preferably has the general formula $$X-R_1-NH_2$$

in which X represents a water solubilizing group, as for example —OH, —SO₃H, or —COOH (i. e. hydroxy, sulphonic or carboxylic), R₁ represents a carbocyclic nucleus, preferably of the benzene or naphthalene series, and —NH₂ represents a primary amino group. While the preferred compounds prepared in accordance with the invention are the reaction products of organic aldehydes containing one aldehydic group with organic amino compounds of the type referred to containing a single primary amino group, in equimolecular proportions, it will be understood that the reaction may also be effected between organic aldehydes of the type described and poly-amino organic compounds of the type referred to, in which case the proportion of the aldehyde is preferably increased sufficiently to react with the additional amino groups present in the organic amino compound. Thus, if the organic amino compound contains two primary amino groups, two molecular proportions of the aldehydic compound are preferably employed.

While the properties of the reaction products may differ somewhat, depending upon the starting materials, the preferred products of the invention have the general formula

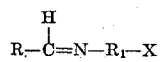

in which R represents a cyclic nucleus, preferably an oxyheterocyclic nucleus or radical, R₁ represents an aromatic radical of the benzene or naphthalene series, and X represents a water solubilizing radical, preferably the carboxylic radical (—COOH). The preferred reaction products for the purpose of the invention are substantially insoluble in water but dissolve in alkaline solutions and are sparingly soluble in ethyl alcohol. In metallic hydroxide solutions, the free carboxylic acid radical (—COOH) is converted to a salt (e. g. —COOY, where Y is a salt forming radical such as Na—, K—, etc.). Similarly, any other free acid radicals present would be neutralized. Typical examples of the preferred reaction products for the purpose of the invention are the reaction product of furfural with anthranilic acid and salts thereof, and the reaction product of piperonyl aldehyde with anthranilic acid and salts thereof.

The invention will be illustrated but is not limited by the following examples, in which the quantities are stated in parts by weight unless otherwise indicated:

*Example I*

One-tenth of a mole of furfural and 1/10 of a mole of anthranilic acid are added to 150 cc. of iso-propyl alcohol and the mixture is refluxed for about 45 minutes to an hour. When the product begins to precipitate heating is discontinued and the product is separated by filtration. This product in solid or powder form has an orchid color, is insoluble in water, dissolves in alkaline zinc-cyanide solutions to give a yellow solution, and is sparingly soluble in ethyl alcohol, iso-propyl alcohol, and butyl alcohol. The chemical structure is indicated by the formula:

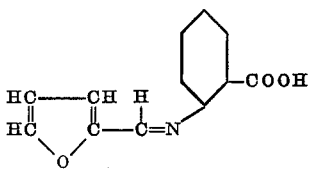

Excellent brightening effects are obtained when this product is incorporated into alkaline zinc-cyanide electroplating baths, particularly in combination with reaction products of gelatin and aldonic acids or in combination with reaction products of protein-rich seed meals and aldonic acids, and in proportions from about 1.5 grams to 20 grams of the furfural anthranilic acid reaction product per gallon of electrolyte.

*Example II*

Approximately 1/10 mole of piperonyl aldehyde is mixed with 1/10 mole of anthranilic acid in 150 cc. of iso-propyl alcohol and refluxed for 2 to 3 hours. The reflux condenser is then removed and the iso-propyl alcohol distilled off until the volume is reduced to approximately one-half (say, about 70 cc.), and thereafter the reaction mixture is cooled. Beautiful yellow crystals of the reaction product of piperonyl aldehyde and anthranilic acid are formed and are filtered off. The residual and the recovered alcohol is used for further reactions. This product is also insoluble in water, dissolves in alkaline solutions to give a yellow solution, and is sparingly soluble in ethyl alcohol. The chemical structure is indicated by the formula:

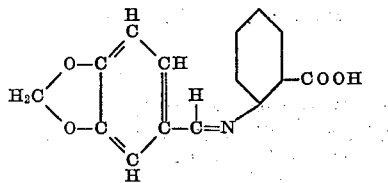

Excellent brightening effects are obtained when this product is incorporated into alkaline cyanide-zinc plating baths, preferably in combination with reaction products of gelatin and aldonic acids or reaction products of protein seed meals and aldonic acids, and preferably in proportions within the range from about 1.5 to 20 grams per gallon of electrolyte. Larger amounts may be employed, but in general do not increase the color effect or brightness of the electrodeposited metal beyond the increase obtained with the maximum amounts in the range specified.

*Example III*

A. A stock solution of the furfural anthranilic acid reaction product of Example I is made by mixing one part of this product with two parts of iso-propyl alcohol.

B. A gelatin-gluconic acid solution is prepared by digesting 10.75 pounds of gelatin with 5 gallons of 50% gluconic acid at 80° F. to 120° F. for ½ to 1 hour, then adding 2 gallons of carbitol and ½ gallon of iso-propyl alcohol.

C. An alkaline cyanide-zinc plating bath is prepared containing

| | Parts |
|---|---|
| Sodium cyanide | 90–100 |
| Zinc metal (added as zinc oxide) | 36–40 |
| Sodium hydroxide | 110–115 | and enough water to make 1000 parts of solution. Two parts of zinc dust are stirred in and the entire mix is filtered to remove heavy metal traces.

About 5 cc. to 60 cc. of A is added to each gallon of C. About 80 cc. of B is separately added to each gallon of C. Excellent results are obtained with the resultant electrolyte in barrel plating operations at current densities up to 20 (preferably 5 to 15) amperes per square foot. The brightness of the deposit varies with the amount of A but the color is not substantially enhanced with amounts greater than 60 cc. per gallon of electrolyte. Similarly, with amounts of B up to 80 cc. per gallon of electrolyte an improvement in color is obtained.

For electroplating operations at higher current densities, say 20 to 80 amperes per square foot, a protein-rich seed meal, such as a substantially de-oiled soya flour or soya protein, reacted with glutonic acid, is used in place of the gelatin-gluconic acid reaction product. A suitable product of this type may be prepared as described in our co-pending application Serial No. 532,534, now Patent No. 2,485,563, October 25, 1949.

Similarly, reaction products of gelatin or vegetable protein-rich seed meals with other aldonic acids, e. g., mannonic, galactonic and arabonic, may be incorporated into alkaline cyanide-zinc electrolytes with aldehyde-amine reaction products of the type herein described.

In a similar manner other reaction products of cyclic aldehydes with cyclic amino compounds are suitable for the practice of the invention. Typical specific examples of suitable aldehydes for the preparation of these reaction products are furfural, piperonyl aldehyde (piperonal), and coumarin-3-aldehyde. Typical examples of amino compounds suitable for reaction with any of the foregoing aldehydes are ortho, meta and para amino carboxylic acids, the alpha amino beta carboxy naphthalenes, the alpha carboxy beta naphthylamines, and the various polyamino carboxylic acids of the benzene or naphthalene series. The aldehyde amine condensation products employed for the purpose of this invention are generally characterized by water insolubility, solubility in alkaline aqueous solutions, and insolubility to sparing solubility in ethyl, propyl and butyl alcohols. The protein-aldonic acid reaction products preferably employed in conjunction with the aldehyde amine condensation products in the alkaline cyanide-zinc plating baths are also soluble in alkaline aqueous solutions. In some instances the protein reaction products, which are preferably dissolved in organic solvents such as carbitol, iso-propyl alcohol, or the like, will form emulsions when added to the alkaline cyanide-zinc electrolyte, which emulsions immediately break to give clear solutions. One method of preparing the protein-aldonic acid reaction products preferable for the purpose of this invention is to digest the protein, for example, a soya protein, with the alkaline cyanide-zinc electrolyte for 12 hours at a temperature of 60° F. to 80° F., or until the soya protein goes into solution. The resultant concentrate may then be added in small amounts to alkaline cyanide-zinc plating baths, either alone or in conjunction with a zinc aldonate, e. g., zinc gluconate, or arylamine salts of aldonic acids, e. g., the alpha naphthylamine salt of gluconic acid, and/or alginates, e. g., ammonium alginate.

The practice of the invention leads to improved color and brightness in the electrodeposition of zinc from alkaline cyanide-zinc plating baths. The cyanide-zinc plating baths are stable over long periods of time and do not tend to form precipitates. Likewise, stock solutions of the amine aldehyde condensation products are stable during storage and shipment. As will be apparent, moreover, only relatively small amounts of the amine aldehyde condensation products are required in order to obtain improved color and brightness. Additional amounts can be added at intervals as needed during an electroplating operation without in any way interfering with the electrodeposition of the zinc.

The invention is hereby claimed as follows:

1. A plating bath comprising an alkaline zinc cyanide bath containing in solution a reaction product of a heterocyclic aldehyde with a carbocyclic primary amine, substantially insoluble in water, soluble in alkaline solutions and sparingly soluble to insoluble in ethyl, propyl and butyl alcohols.

2. A plating bath consisting essentially of an alkaline zinc cyanide bath containing in solution a reaction product of an oxyheterocyclic aldehyde with a carbocyclic primary amine, substantially insoluble in water, soluble in alkaline solutions and sparingly soluble to insoluble in ethyl, propyl and butyl alcohols.

3. A plating bath comprising an alkaline zinc cyanide bath containing in solution a reaction product of furfural with a carbocyclic primary amine, substantially insoluble in water, soluble in alkaline solutions and sparingly soluble to insoluble in ethyl, propyl and butyl alcohols.

4. A plating bath consisting essentially of an alkaline zinc cyanide bath containing in solution a reaction product of piperonyl aldehyde with a carbocyclic primary amine, substantially insoluble in water, soluble in alkaline solutions and sparingly soluble to insoluble in ethyl, propyl and butyl alcohols.

5. A plating bath comprising an alkaline zinc cyanide bath containing in solution a reaction product of a heterocyclic aldehyde with a primary amino carboxylic acid selected from the group consisting of amino carboxylic acids of the benzene and naphthalene series, which reaction product is substantially insoluble in water, soluble in alkaline solutions and sparingly soluble to insoluble in ethyl, propyl and butyl alcohols.

6. A plating bath consisting essentially of an alkaline zinc cyanide bath containing in solution a reaction product of a heterocyclic aldehyde with a primary amino carboxylic acid of the benzene series, which is characterized by substantial insolubility in water, solubility in alkaline solutions and sparing solubility to insolubility in propyl alcohol.

7. A plating bath comprising an alkaline zinc cyanide bath containing in solution a compound selected from the group consisting of compounds having the following general structural formula

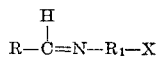

and salts thereof, wherein R represents a cyclic nucleus, $R_1$ represents an aromatic radical of the benzene or naphthalene series and X represents a carboxylic acid radical.

8. A plating bath comprising an alkaline zinc cyanide bath containing in solution a compound selected from the group consisting of compounds having the following general structural formula

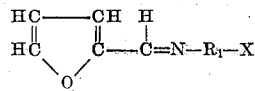

and salts thereof, wherein $R_1$ represents a benzene radical and X represents a carboxylic acid radical.

9. A plating bath consisting essentially of an alkaline zinc cyanide bath containing in solution a compound selected from the group consisting of compounds having the following general chemical structure

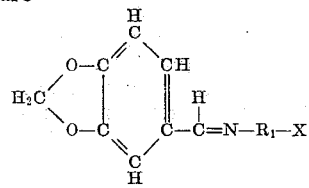

and salts thereof, wherein $R_1$ is a benzene radical and X is a carboxylic acid radical.

10. A plating bath comprising an alkaline zinc cyanide bath containing in solution a reaction product prepared by refluxing furfural and anthranilic acid which is insoluble in water, soluble in alkaline solutions and sparingly soluble in propyl alcohol.

11. A plating bath consisting essentially of an alkaline zinc cyanide bath containing in solution a reaction product prepared by refluxing piperonyl aldehyde and anthranilic acid which is insoluble in water, soluble in alkaline solutions and sparingly soluble in propyl alcohol.

12. A plating bath consisting essentially of an alkaline zinc cyanide bath containing in solution a water-insoluble, alkali-soluble reaction product of a heterocyclic aldehyde with a carbocyclic primary amine and a reaction product of a protein with an aldonic acid.

13. A plating bath comprising an alkaline zinc cyanide bath containing in solution the water-insoluble, alkali-soluble reaction product of furfural and anthranilic acid and a reaction product of a protein with gluconic acid.

14. A plating bath consisting essentially of an alkaline zinc cyanide bath containing in solution the water-insoluble, alkali-soluble reaction product prepared by refluxing piperonyl aldehyde with anthranilic acid and a reaction product of a protein with gluconic acid.

15. In the electrodeposition of zinc, the step which comprises electrodepositing zinc from an alkaline cyanide-zinc plating bath in the presence of an alkali-soluble reaction product of a cyclic aldehyde with a carbocyclic primary amine.

16. In the electrodeposition of zinc, the step which consists in electrodepositing zinc from an alkaline cyanide-zinc plating bath in the presence of a water-insoluble, alkali-soluble reaction product of an oxyheterocyclic aldehyde with a carbocyclic primary amine.

17. In the electrodeposition of zinc, the step which comprises electrodepositing zinc from an alkaline cyanide-zinc plating bath in the presence of a water-insoluble, alkali-soluble reaction product prepared by refluxing furfural with a primary amino carboxylic acid of the benzene series.

18. In the electrodeposition of zinc, the step which comprises electrodepositing zinc from an alkaline cyanide-zinc plating bath in the presence of a water-insoluble, alkali-soluble reaction product prepared by refluxing piperonyl aldehyde with a primary amino carboxylic acid of the benzene series.

19. In the electrodeposition of zinc, the step which comprises electrodepositing zinc from an alkaline cyanide-zinc plating bath in the presence of a water-insoluble, alkali soluble reaction product prepared by refluxing furfural with anthranilic acid and a reaction product of gluconic acid with a proteinaceous material selected from the group consisting of gelatin and protein-rich vegetable seed meals.

20. In the electrodeposition of zinc, the step which consists in electrodepositing zinc from an alkaline cyanide-zinc plating bath in the presence of a water-insoluble, alkali-soluble reaction product prepared by refluxing piperonyl aldehyde with anthranilic acid and a reaction product of gluconic acid with a proteinaceous material selected from the group consisting of gelatin and protein-rich vegetable seed meals.

ALLAN E. CHESTER.
FREDERICK F. REISINGER.

REFERENCES CITED

The following references are of record in the file of this patent:

UNITED STATES PATENTS

| Number | Name | Date |
| --- | --- | --- |
| 2,097,630 | Lutz | Nov. 2, 1937 |
| 2,101,580 | Hendricks | Dec. 7, 1937 |
| 2,196,588 | Hull | Apr. 9, 1940 |
| 2,390,511 | Chester et al. | Dec. 11, 1945 |

OTHER REFERENCES

Lowry and Harrow, Introduction to Organic Chemistry, Fourth edition (1936), page 151, published by J. Wiley & Sons, New York.